United States Patent
Ito et al.

(10) Patent No.: US 9,335,496 B2
(45) Date of Patent: May 10, 2016

(54) PHOTOELECTRIC CONVERSION MODULE

(75) Inventors: Masanobu Ito, Hitachi (JP); Hiroki Yasuda, Mito (JP); Kouki Hirano, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 600 days.

(21) Appl. No.: 13/348,887

(22) Filed: Jan. 12, 2012

(65) Prior Publication Data

US 2012/0181535 A1 Jul. 19, 2012

(30) Foreign Application Priority Data

Jan. 18, 2011 (JP) .................................. 2011-008021

(51) Int. Cl.
*G02B 6/42* (2006.01)

(52) U.S. Cl.
CPC .............. *G02B 6/4214* (2013.01); *G02B 6/428* (2013.01); *G02B 6/4249* (2013.01); *G02B 6/4284* (2013.01)

(58) Field of Classification Search
CPC ................... H01L 2924/00; H01L 222/48227; H01L 2224/73265; H01L 2924/00012; H01L 2224/48247; H01L 2224/48465; H01L 2924/15165; H01L 2224/32225; H01L 2224/49171; H01L 2924/15153; H01L 2224/32245; G06F 1/18; G06F 1/1632; G06F 21/86; G06F 3/005; H05K 2201/058; H05K 2201/0999; H05K 2201/10151; H05K 3/284; H05K 3/365; H05K 1/02; H05K 1/0254; H05K 1/0274; H05K 1/0275; H05K 1/092; H05K 1/117; H05K 1/14; H05K 1/181; H05K 2201/09036

USPC .................................................. 361/736–737
See application file for complete search history.

(56) References Cited

U.S. PATENT DOCUMENTS

| | | | | |
|---|---|---|---|---|
| 6,115,515 A | * | 9/2000 | Itoh et al. ......................... | 385/14 |
| 2007/0183709 A1 | * | 8/2007 | Furuno et al. ................... | 385/14 |
| 2008/0240648 A1 | * | 10/2008 | Im ..................................... | 385/14 |
| 2009/0196600 A1 | | 8/2009 | Sakamoto et al. | |
| 2009/0297095 A1 | * | 12/2009 | Matsuoka ........................ | 385/14 |
| 2009/0323748 A1 | * | 12/2009 | Nobuhara .................. | 372/43.01 |
| 2011/0031379 A1 | * | 2/2011 | Ishigami et al. .............. | 250/216 |

FOREIGN PATENT DOCUMENTS

JP          2009-187995 A       8/2009

* cited by examiner

*Primary Examiner* — Jenny L Wagner
*Assistant Examiner* — Ahmad D Barnes
(74) *Attorney, Agent, or Firm* — Roberts Mlotkowski Safran & Cole, PC

(57) ABSTRACT

A photoelectric conversion module includes a circuit board including a plurality of first board-side electrodes and a plurality of second board-side electrodes that are alternately arranged on a mounting surface of the circuit board in an array direction and each extend into strips in a direction orthogonal to the array direction, a photoelectric conversion array element mounted on the circuit board and including, on a surface facing the mounting surface, a plurality of light receiving/emitting portions, first element-side electrodes connected to the first board-side electrodes and second element-side electrodes connected to the second board-side electrodes, and an IC chip mounted on the circuit board. The circuit board further includes, on the mounting surface, a connecting portion for connecting the first board-side electrodes to each other and a first electrode land portion connected to the first board-side electrode or the connecting portion to contact with a first test electrode probe.

12 Claims, 7 Drawing Sheets

PHOTOELECTRIC CONVERSION MODULE

The present application is based on Japanese patent application No. 2011-008021 filed on Jan. 18, 2011, the entire contents of which are incorporated herein by reference.

BACKGROUND OF THE INVENTION

1. Field of the Invention

The invention relates to a photoelectric conversion module and a method of manufacturing the photoelectric conversion module.

2. Description of the Related Art

To have a connection between, e.g., a server and a switch in a data center or between digital AV (audio-visual) equipment, an optical fiber as well as a metal wire is used as a transmission medium. In addition, it has been considered to use an optical fiber (i.e., optical interconnect) as a transmission medium also inside an information processing equipment such as a mobile phone or a personal computer.

When using the optical fiber, a photoelectric conversion module is needed for converting an electrical signal into an optical signal or an optical signal into an electrical signal. The photoelectric conversion element includes, e.g., a surface emitting LD (laser diode), i.e., VCSEL (vertical cavity surface emitting laser).

JP-A-2009-187995 proposes to conduct a burn-in test conducted after mounting a VCSEL and a driver circuit in a package in order to ensure the reliability of the VCSEL.

SUMMARY OF THE INVENTION

The VCSEL includes an array element with plural light emitting portions, and the array element may be flip-chip-mounted on a circuit board. In other words, the array element may have, on one surface thereof, plural light emitting portions and a first element-side electrode and a second element-side electrode provided corresponding to each of the light emitting portions.

In a high-speed transmission photoelectric conversion module, an IC chip for driving the array element is mounted near the flip-chip-mounted array element. In this case, a first board-side electrode and a second board-side electrode are alternately disposed in the form of a stripe on a circuit board in order to connect the array element and the IC chip.

The burn-in test of the array element mounted on the circuit board may be conducted after mounting the array element and before mounting the IC chip. In the burn-in test, probes are brought into contact with the first and second board-side electrodes to feed electric power to the array element via the probes.

However, a pitch between the first board-side electrode and the second board-side electrode can be, e.g., about 125 μm and it is therefore difficult to have the probes precisely contact with the first and second board-side electrodes. Therefore, since the burn-in test may need a long time, a problem may arise that it needs time to ensure the reliability of the photoelectric conversion array element.

Accordingly, it is an object of the invention to provide a photoelectric conversion module that is provided with a photoelectric conversion array element having plural first and second element-side electrodes on the same surface as light receiving/emitting portions and facilitates to ensure reliability of the photoelectric conversion array element, and a method of manufacturing the photoelectric conversion module.

(1) According to one embodiment of the invention, a photoelectric conversion module comprises:

a circuit board comprising a plurality of first board-side electrodes and a plurality of second board-side electrodes that are alternately arranged on a mounting surface of the circuit board in an array direction and each extend into strips in a direction orthogonal to the array direction;

a photoelectric conversion array element mounted on the circuit board and comprising, on a surface facing the mounting surface, a plurality of light receiving/emitting portions, first element-side electrodes connected to the first board-side electrodes and second element-side electrodes connected to the second board-side electrodes, the first element-side electrodes and the second element-side electrodes being each formed corresponding to the light receiving/emitting portions; and an IC chip mounted on the circuit board and connected to the photoelectric conversion array element through the first board-side electrodes and the second board-side electrodes, wherein the circuit board further comprises, on the mounting surface, a connecting portion for connecting the first board-side electrodes to each other and a first electrode land portion connected to the first board-side electrode or the connecting portion to contact with a first test electrode probe.

In the above embodiment (1) of the invention, the following modifications and changes can be made.

(i) The first electrode land portion is connected to an end one of the first board-side electrodes in the array direction and located nearer the IC chip in relation to a center of the strip first board-side electrodes.

(ii) The second board-side electrodes each comprises a second electrode land portion wider than an other portion thereof to contact with a second test electrode probe.

(iii) The connecting portion is distant from an end of the photoelectric conversion array element not facing the IC chip in the strip direction of the first board-side electrodes to have an opening therebetween.

(iv) The photoelectric conversion array element comprises a light-emitting element.

(2) According to another embodiment of the invention, a method of manufacturing a photoelectric conversion module, the photoelectric conversion module comprising:

a circuit board comprising a plurality of first board-side electrodes and a plurality of second board-side electrodes that are alternately arranged on a mounting surface of the circuit board in an array direction and each extend into strips in a direction orthogonal to the array direction;

a photoelectric conversion array element mounted on the circuit board and comprising, on a surface facing the mounting surface, a plurality of light receiving/emitting portions, first element-side electrodes connected to the first board-side electrodes and second element-side electrodes connected to the second board-side electrodes, the first element-side electrodes and the second element-side electrodes being each formed corresponding to the light receiving/emitting portions; and an IC chip mounted on the circuit board and connected to the photoelectric conversion array element through the first board-side electrodes and the second board-side electrodes, wherein the circuit board further comprises, on the mounting surface, a connecting portion for connecting the first board-side electrodes to each other and a first electrode land portion connected to the first board-side electrode or the connecting portion to contact with a first test electrode probe, the method comprising:

contacting second electrode probes with the second board-side electrodes and contacting the first electrode probe with the first electrode land portion after connecting the first element-side electrodes and the second element-side electrodes of the photoelectric conversion array element to the first board-side electrodes and the second board-side electrodes of the circuit board and before mounting the IC chip on the circuit board so as to inspect a performance of the photoelectric conversion array element via the first electrode probe and the second electrode probes.

Points of the Invention

According to one embodiment of the invention, a photoelectric conversion module is constructed such that its cathode electrode pattern allows plural board-side cathode electrodes to be all connected (i.e., short-circuited) through a connecting portion, and a cathode electrode land portion is provided being connected to an end one of the board-side cathode electrodes in the overlap direction. Therefore, only one probe cathode electrode probe needs to contact with the cathode electrode land portion at the time of the burn-in test, regardless of the number of the board-side cathode electrodes. The other anode electrode probes only need to contact with board-side anode electrodes at a pitch between the two adjacent board-side anode electrodes, not at a pitch Pe between the board-side cathode electrodes and the board-side anode electrodes. Thus, since the burn-in test can be conducted in short time, a high productivity can be obtained for providing the photoelectric conversion module at low production cost.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

An embodiment of the invention will be described below in reference to the drawings.

Figure 1:
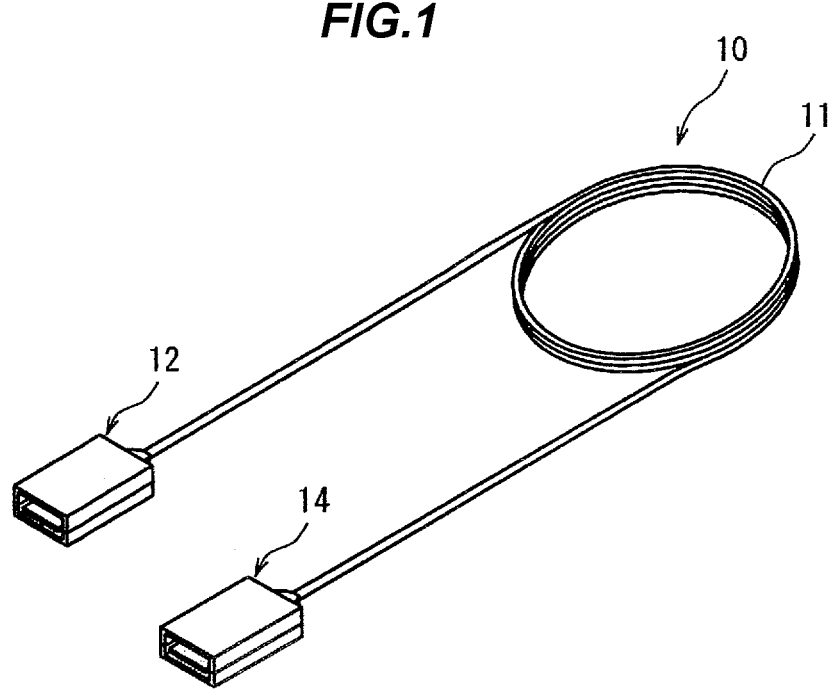
FIG. 1 is a schematic structural perspective view showing an optical active cable provided with a photoelectric conversion module in an embodiment.

FIG. 1 is a schematic perspective view showing an outer appearance of an optical active cable 10.

The optical active cable 10 is composed of a photoelectric composite cable 11, and an optical transmitter 12 and an optical receiver 14 which are attached to both ends of the photoelectric composite cable 11. The optical active cable 10 is used for connection between digital AV equipments.

Figure 2:
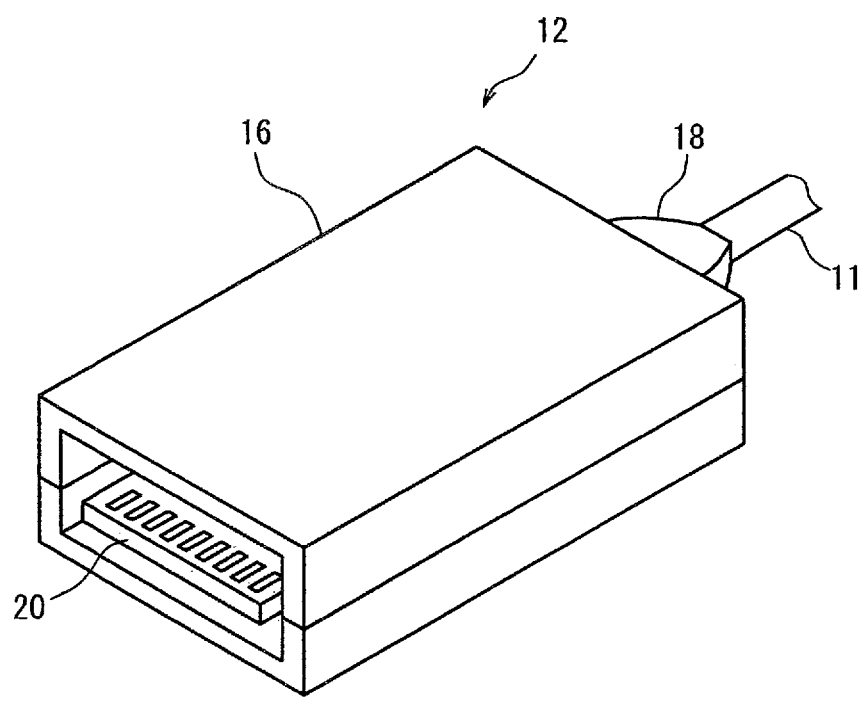
FIG. 2 is an enlarged perspective view showing an optical transmitter of the optical active cable in FIG. 1 and the vicinity thereof.

FIG. 2 is an enlarged perspective view showing the optical transmitter 12 with a portion of the photoelectric composite cable 11.

The optical transmitter 12 has a housing 16 made of, e.g., metal which has, e.g., a box shape. The photoelectric composite cable 11 is extended out from one end of the housing 16 via a sealing member 18 while an opening is formed at another end of the housing 16.

In the opening of the housing 16, for example, an end portion of a rigid circuit board 20 is located. The end portion of the circuit board 20 is insertable into a slot provided on a digital AV equipment.

Figure 3:
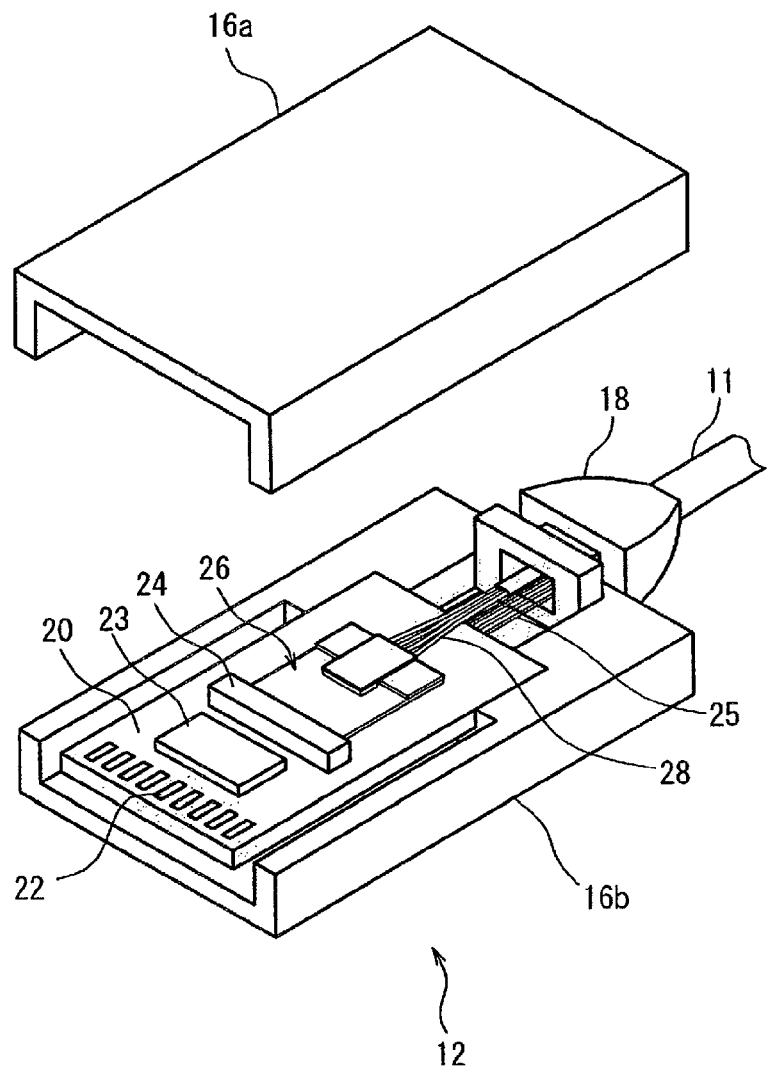
FIG. 3 is a schematic exploded perspective view showing the optical transmitted in FIG. 2.

FIG. 3 is a schematic exploded perspective view showing the optical transmitter 12. The housing 16 is composed of, e.g., a first case 16a and a second case 16b which are separable from each other.

The circuit board 20 is a rigid board made of, e.g., glass epoxy, and is fixed to the second case 16b. A predetermined conductor pattern made of, e.g., metal such as copper is formed on the circuit board 20. The conductor pattern includes plural electrode terminals 22 which are arranged at an end portion of the circuit board 20. The electrode terminals 22 are electrically connected to electrode terminals provided on the digital AV equipment.

An information processing LSI (large-scale integrated circuit) 23 and a connector 24 are attached to the circuit board 20.

The photoelectric composite cable 11 includes plural conductors 25 which extend into the housing 16 through the sealing member 18. The front end portions of the conductors 25 located inside the housing 16 are soldered to the circuit board 20. The connector 24 and the conductors 25 are electrically connected to the LSI 23 via the conductor pattern and the LSI 23 is electrically connected to the electrode terminals 22.

Meanwhile, the photoelectric composite cable 11 includes, e.g., four optical fibers 28 which also extend into the housing 16 through the sealing member 18. Then, the front ends of the optical fibers 28 located inside the housing 16 are fixed to an end of a photoelectric conversion module 26 in the embodiment.

Photoelectric Conversion Module

Another end of the photoelectric conversion module 26 is connected to the connector 24. The photoelectric conversion module 26 of the optical transmitter 12 has a function of converting an electrical signal received from the digital AV equipment into an optical signal to be sent to the optical fiber 28.

Meanwhile, the photoelectric conversion module 26 of the optical receiver 14 has a function of converting an optical signal received from the optical fiber 28 into an electrical signal to be sent to the digital AV equipment.

Figure 4:
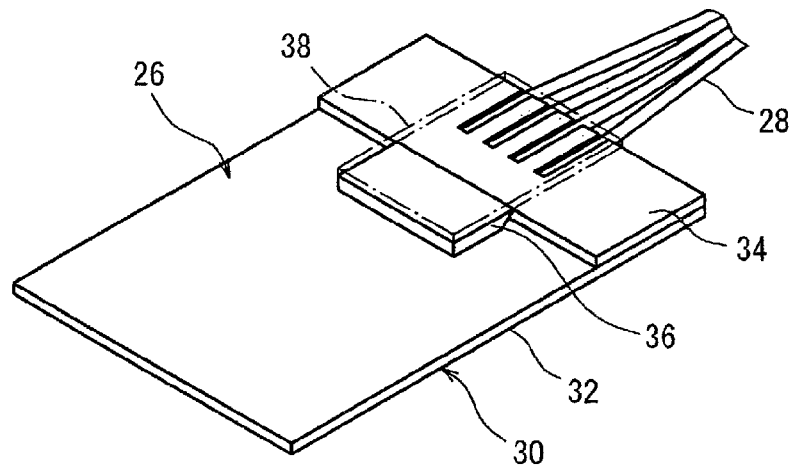
FIG. 4 is a schematic perspective view showing one side of the photoelectric conversion module in FIG. 3.

FIG. 4 is a perspective view showing the photoelectric conversion module 26 on the first case 16*a* side. The photoelectric conversion module 26 includes a FPC board (flexible printed circuit board) 30 which is composed of, e.g., a flexible and translucent film 32 made of, e.g., polyimide, and a conductor pattern made of, e.g., metal such as copper provided on the film 32. Alternatively, translucency may be obtained by forming holes on the FPC board 30.

A sheet-like polymer optical waveguide member 34 is integrally provided at an end portion of one surface of the FPC board 30 on a side where the optical fiber 28 is fixed. Four grooves corresponding to the number of the optical fibers 28 are formed in a stripe pattern at an end portion of the polymer optical waveguide member 34, and each groove accommodates the front end portion of the optical fiber 28.

Meanwhile, a mirror member 36 is fixed to the one surface of the FPC board 30 by using an adhesive. As an adhesive, it is possible to use, e.g., a thermosetting resin or a UV curable resin.

Then, a reinforcement plate 38 made of, e.g., metal or glass is fixed on the mirror member 36 and on the polymer optical waveguide member 34 by using an adhesive. Note that, the reinforcement plate 38 is shown by an alternate long and short dash line in FIG. 4.

Figure 5:
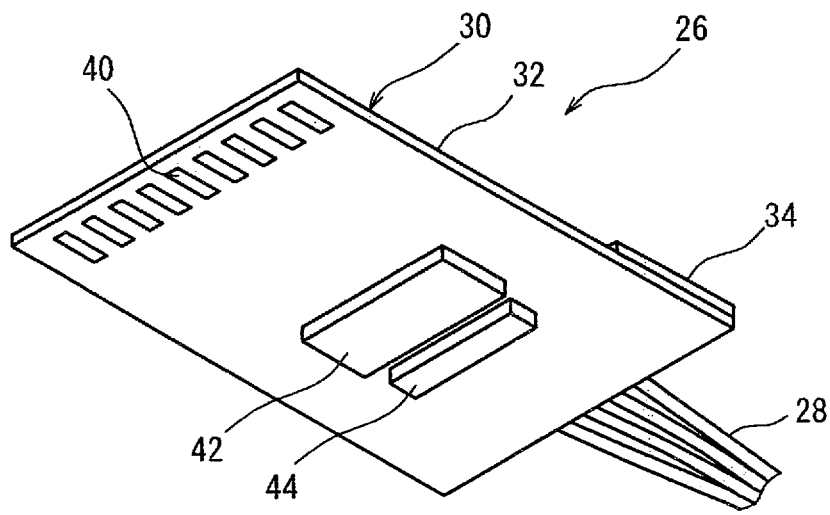
FIG. 5 is a schematic perspective view showing another side of the photoelectric conversion module in FIG. 3.

FIG. 5 is a perspective view showing the photoelectric conversion module 26 on the second case 16*b* side.

The conductor pattern of the FPC board 30 includes plural electrode terminals 40 formed at an end portion of the film 32, and the electrode terminals 40 are connected to the connector 24. The conductor pattern can be made by, e.g., etching a metal film formed on the film 32.

An IC (Integrated Circuit) chip 42 and a photoelectric conversion array element 44 are, e.g., flip-chip-mounted at a predetermined position on another surface of the FPC board 30 and are electrically connected to the conductor pattern.

The photoelectric conversion array element 44 is arranged in the vicinity of and along one side of the IC chip 42. In the photoelectric conversion module 26 of the optical transmitter 12, the photoelectric conversion array element 44 is a light-emitting element such as LD (laser diode) and the IC chip 42 constitutes a driver circuit for the light-emitting element.

Meanwhile, in the photoelectric conversion module 26 of the optical receiver 14, the photoelectric conversion array element 44 is a light-receiving element such as PD (photodiode) and the IC chip 42 constitutes an amplifier circuit for amplifying an electrical signal from the light-receiving element.

The photoelectric conversion array element 44 is a surface emitting type or a surface receiving type and is arranged so that a light outputting or inputting surface thereof faces a surface of the FPC board 30.

Figure 6:
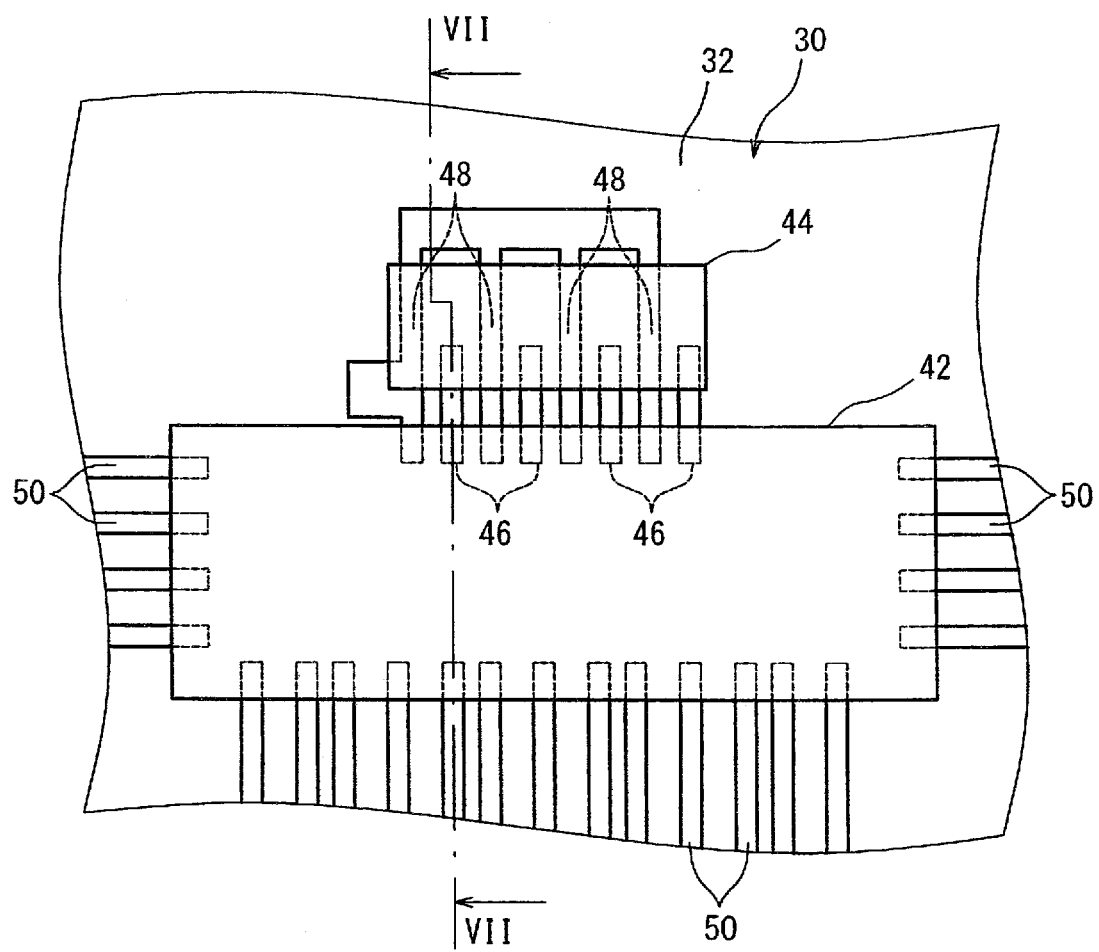
FIG. 6 is a schematic enlarged plan view showing an IC chip and a photoelectric conversion element of the photoelectric conversion module in FIG. 5 and the vicinity thereof.

FIG. 6 is a schematic enlarged plan view showing the IC chip 42 and the photoelectric conversion array element 44 in FIG. 5 and the periphery thereof. The IC chip 42 is electrically connected to the photoelectric conversion array element 44 via plural board-side anode electrodes 46 and plural board-side cathode electrodes 48 which constitute a portion of the conductor pattern of the FPC board 30. In addition, the IC chip 42 is electrically connected to the electrode terminals 40 through plural electrodes 50 which constitute a portion of the conductor pattern.

Figure 7:
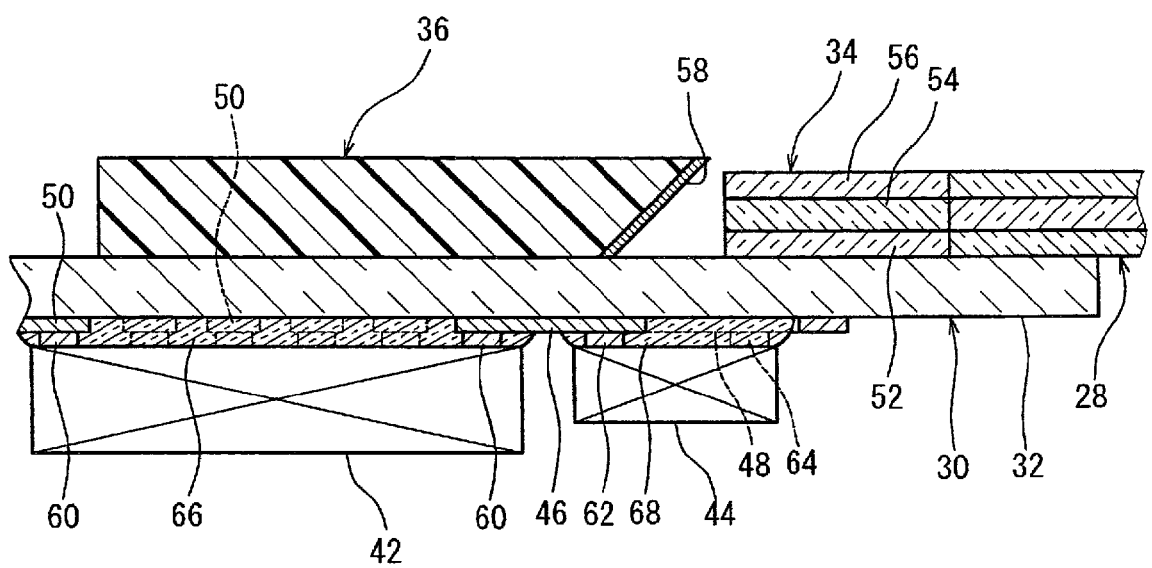
FIG. 7 is a schematic partial cross sectional view showing the photoelectric conversion module taken along VII-VII line in FIG. 6.

FIG. 7 is a schematic partial cross sectional view showing the photoelectric conversion module 26 taken along VII-VII line in FIG. 6. It should be noted that the reinforcement plate 38 is omitted in FIG. 7.

The polymer optical waveguide member 34 includes an under cladding layer 52, a core 54 and an over cladding layer 56. The under cladding layer 52 is laminated on the FPC board 30 and the core 54 having a square cross section when viewed from a traveling direction of an optical signal extends on the under cladding layer 52.

The number of the cores 54 is four corresponding to the number of the optical fibers 28, and the four cores 54 are arranged in parallel at a distance from each other and are located coaxial with the front end portions of the optical fibers 28. The over cladding layer 56 is laminated on the under cladding layer 52 and the core 54 so that the core 54 is surrounded by the over cladding layer 56 and the under cladding layer 52.

Materials of the cladding layer 52, the core 54 and the over cladding layer 56 are not specifically limited, and it is possible to used, e.g., an acrylic resin, an epoxy resin and a polyimide resin, etc.

Both edges of the cores 54 are respectively exposed at an end face of the groove and at an end face of the polymer optical waveguide member 34 facing a mirror surface 58. In addition, one end of the core 54 is optically connected to the optical fiber 28 by abutting against the end face of the optical fiber 28, and another end of the core 54 is optically connected to the mirror surface 58 of the mirror member 36 facing thereto.

The mirror surface 58 is arranged on an optical path extending between the photoelectric conversion array element 44 and the core 54 to bend the optical path 90°. In other words, the optical path penetrates the FPC board 30.

The mirror member 36 is made by, e.g., integrally molding a resin and then depositing thereon a metal film constituting the mirror surface 58 such as gold.

The IC chip 42 and the photoelectric conversion array element 44 are connected to the electrode 50, the board-side anode electrode 46 and the board-side cathode electrode 48 via bumps 60, 62 and 64 each formed of, e.g., Au. Filling members (i.e., underfill materials) 66 and 68 formed of a translucent resin are respectively provided so as to fill a gap between the IC chip 42 and the FPC board 30 and that between the photoelectric conversion array element 44 and the FPC board 30 in order to ensure connection strength of the IC chip 42 and the photoelectric conversion array element 44 to the FPC board 30.

Figure 8:
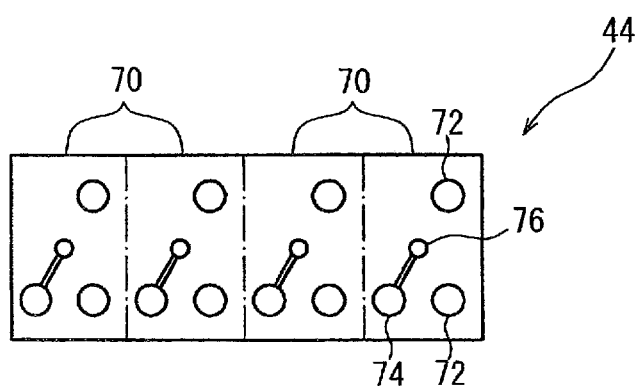
FIG. 8 is a schematic perspective view showing a light outputting surface of the photoelectric conversion element in FIG. 7.

FIG. 8 is a schematic plan view showing a light outputting surface of the photoelectric conversion array element 44 which faces the FPC board 30.

The photoelectric conversion array element 44 is an array element composed of integrally formed plural photoelectric conversion elements 70, and four photoelectric conversion elements 70 are included in the present embodiment so as to correspond to the number of the optical fibers 28.

Each photoelectric conversion element 70 has, on a light outputting surface thereof, e.g., two element-side cathode electrodes 72, an element-side anode electrode 74 and a light receiving/emitting portion 76. In this regard, one of the element-side cathode electrodes 72 may be a dummy electrode. In case of the light-emitting element, each photoelectric conversion element 70 emits light from the light receiving/emitting portion 76 when voltage is applied between the element-side cathode electrodes 72 and the element-side anode electrode 74.

Meanwhile, when the photoelectric conversion array element 44 is a light-receiving element, the light-receiving element receives light at the light receiving/emitting portion 76.

Figure 9:
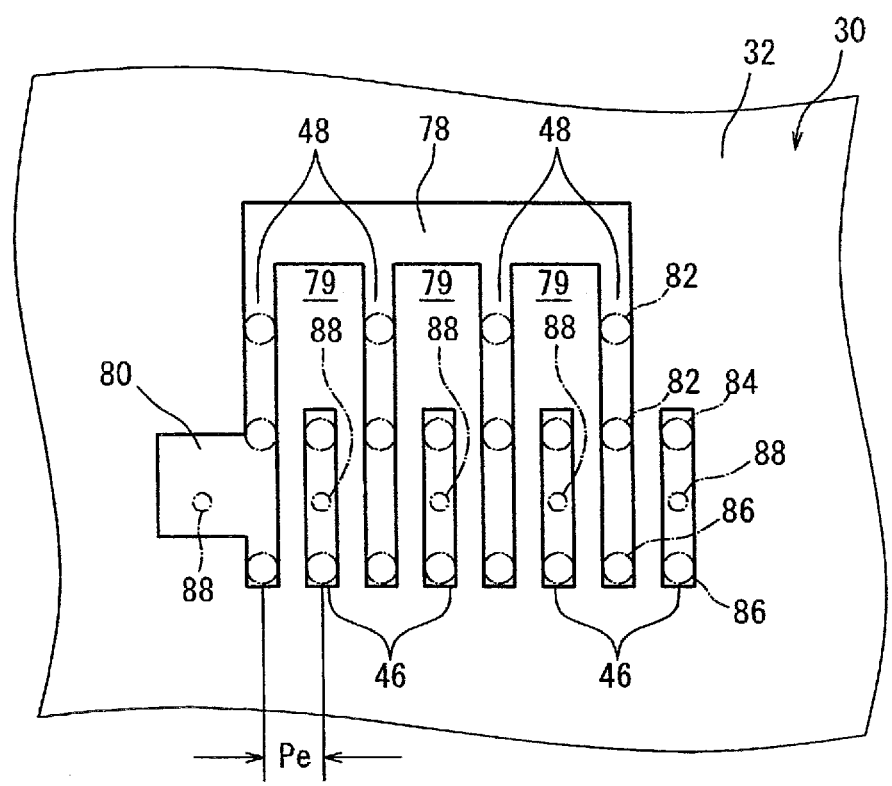
FIG. 9 is a schematic partial plan view showing a region of a circuit board for mounting the photoelectric conversion element in FIG. 8.

FIG. 9 is a schematic enlarged plan view showing the board-side cathode electrodes 48 and the board-side anode electrodes 46 of the FPC board 30.

The board-side cathode electrode 48 and the board-side anode electrode 46 each have a band-like shape and extend in a spacing direction between the IC chip 42 and the photoelectric conversion array element 44. The board-side cathode electrodes 48 and the board-side anode electrodes 46 are parallel to each other and are alternately arranged in a direction orthogonal to the spacing direction (array direction) at a certain pitch Pe. The pitch Pe is, e.g., about 125 µm.

The edges of the board-side cathode electrodes 48 and those of the board-side anode electrodes 46 are aligned on the IC chip 42 side while the edges of the board-side cathode electrodes 48 are extended over those of the board-side anode electrodes 46 on the photoelectric conversion array element 44 side. In addition, the edges of the board-side cathode electrodes 48 on the photoelectric conversion array element 44 side are connected to each other through a connecting portion 78 which is integrated with the board-side cathode electrodes 48.

The connecting portion 78 constitutes a portion of the conductor pattern of the FPC board 30 and extends in an array direction of the board-side cathode electrodes 48 and the board-side anode electrodes 46. The connecting portion 78 has, e.g., a band-like shape which is wider than the board-side cathode electrode 48 and the board-side anode electrode 46.

The connecting portion 78 is preferably distant from the photoelectric conversion array element 44 when viewed from the spacing direction between the IC chip 42 and the photoelectric conversion array element 44, i.e., from an extending direction of the board-side cathode electrode 48 and the board-side anode electrode 46. Therefore, a gap 79 defined between the board-side cathode electrodes 48 extends to and opens outside of the photoelectric conversion array element 44 on the connecting portion 78 side.

In addition, on the board-side cathode electrode 48 located at an edge in the array direction, a cathode electrode land portion 80 having, e.g., a square shape is integrally formed on a side near the IC chip 42. The cathode electrode land portion 80 is wider than the board-side cathode electrode 48. The cathode electrode land portion 80 also constitutes a portion of the conductor pattern of the FPC board 30 and protrudes outward in the array direction.

It should be noted that the board-side cathode electrode 48, the connecting portion 78 and the cathode electrode land portion 80 are collectively referred to as a cathode electrode pattern in the following explanation.

Here, circles 82 and 84 shown by an alternate long and short dash line in FIG. 9 show regions connected to the element-side cathode electrodes 72, 72 and the element-side anode electrode 74 by the bumps 64 and 62. In addition, circles 86 show regions connected to the IC chip 42 by the bumps 60. Furthermore, circles 88 show regions to be in contact with tips of probes for a burn-in test.

Burn-In Test

A method for a burn-in test conducted during a process of manufacturing the photoelectric conversion module 26 will be described below.

The burn-in test is conducted after flip-chip-mounting the photoelectric conversion array element 44 on the FPC board 30 and filling the filling member 68 and before mounting the IC chip 42. In addition, the burn-in test is conducted such that the FPC board 30 having the photoelectric conversion array element 44 mounted thereon is placed in a constant-temperature oven adjusted to a predetermined temperature.

Figure 10:
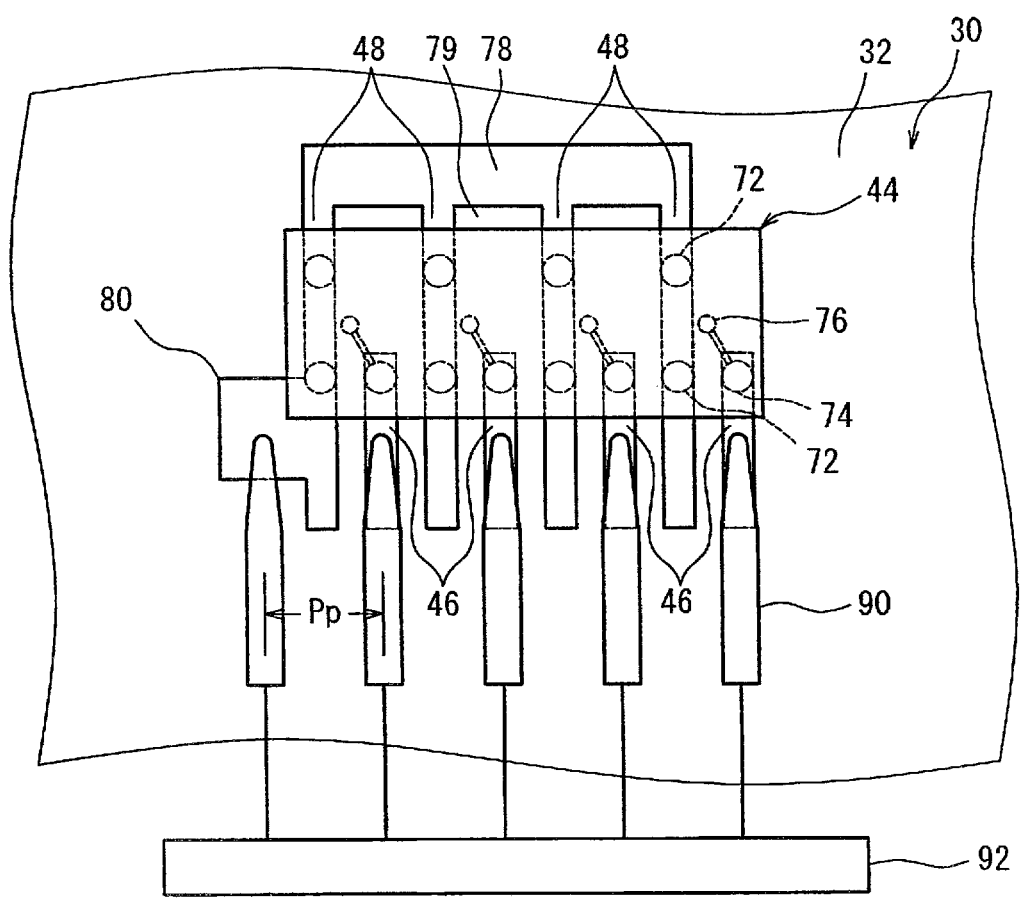
FIG. 10 is an explanatory diagram illustrating a method of testing the photoelectric conversion element in a method of manufacturing the photoelectric conversion module in FIG. 4.

FIG. 10 is schematic plan view showing the FPC board 30 in the vicinity of the photoelectric conversion array element 44. As shown in FIG. 10, tips of five probes 90 are respectively brought into contact with the four board-side anode electrodes 46 and the cathode electrode land portion 80 in the present embodiment.

As a preferred aspect, the five probes 90 are arrayed along the array direction of the board-side cathode electrodes 48 and the board-side anode electrodes 46 in the present embodiment. A pitch Pp of the probes 90 is, e.g., about 250 µm, which is double the pitch Pe of the board-side cathode electrodes 48 and the board-side anode electrodes 46.

The five probes 90 are connected to a constant-current power supply 92, the constant-current power supply 92 supplies a constant current in parallel to each of the four photoelectric conversion elements 70 via the five probes 90 for a predetermined time, thereby conducting the burn-in test.

In the burn-in test, light emitted from the light receiving/emitting portion 76 of the photoelectric conversion array element 44 is monitored and quality of the test results is judged depending on intensity of the emitted light. In other words, when light is not emitted from even one of the four light receiving/emitting portions 76 or fades out over time, such a photoelectric conversion array element 44 not satisfying a predetermined light output intensity is judged as a defective product and is disposed.

In the photoelectric conversion module 26 of the embodiment, defective photoelectric conversion array elements 44 are eliminated by conducting the burn-in test during the manufacturing process. Therefore, the photoelectric conversion module 26 has high reliability.

On the other hand, in the cathode electrode pattern of the photoelectric conversion module 26, plural board-side cathode electrodes 48 are connected through the connecting portion 78 and the cathode electrode land portion 80 is provided. Therefore, regarding the board-side cathode electrode 48, it is only necessary to bring one probe (cathode electrode probe) 90 into contact with the cathode electrode land portion 80 at the time of the burn-in test, regardless of the number of the board-side cathode electrodes 48.

Then, remaining four probes (anode electrode probes) 90 at a pitch of the board-side anode electrodes 46, not at the pitch Pe of the board-side cathode electrodes 48 and the board-side anode electrodes 46, are brought into contact with the board-side anode electrodes 46.

Therefore, this cathode electrode pattern facilitates contact with the probes 90 and it is thus easy to conduct the burn-in test. As a result, reliability of the photoelectric conversion array element 44 is easily ensured in the photoelectric conversion module 26. In addition, productivity is high since the burn-in test is conducted in short time, and the photoelectric conversion module 26 is thus provided at low cost.

As a preferred aspect of the photoelectric conversion module 26 in the embodiment, the connecting portion 78 is distant from the edge of the photoelectric conversion array element 44 and the gap 79 opens outside of the photoelectric conversion array element 44. Therefore, a resin as a material of the filling member 68 is easily injected into a gap between the FPC board 30 and the photoelectric conversion array element 44 through the opening when the filling member 68 is formed. As a result, the photoelectric conversion module 26 has high productivity.

The invention is not limited to the embodiment and includes aspects in which some changes are added to the embodiment.

Figure 11:
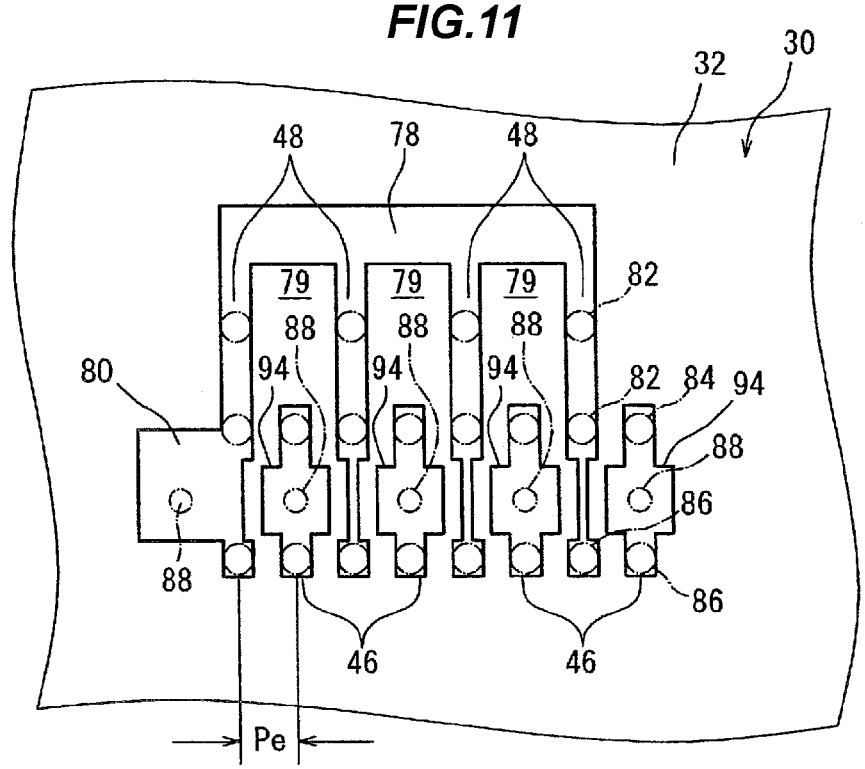
FIG. 11 is a schematic partial plan view showing a region of a circuit board for mounting the photoelectric conversion element of the photoelectric conversion module in a modification.

For example, although the board-side anode electrodes 46 each have a uniform width in the photoelectric conversion module 26 of the embodiment, a region to be in contact with the probe 90 may be formed to be wide to provide an anode electrode land portion 94 as shown in FIG. 11. This further facilitates contact of the probe 90 with the board-side anode electrode 46.

Alternatively, in this case, a region of the board-side cathode electrode 48 adjacent to the anode electrode land portion 94 may be formed to be narrow if necessary, as shown in FIG. 11.

Figure 12:
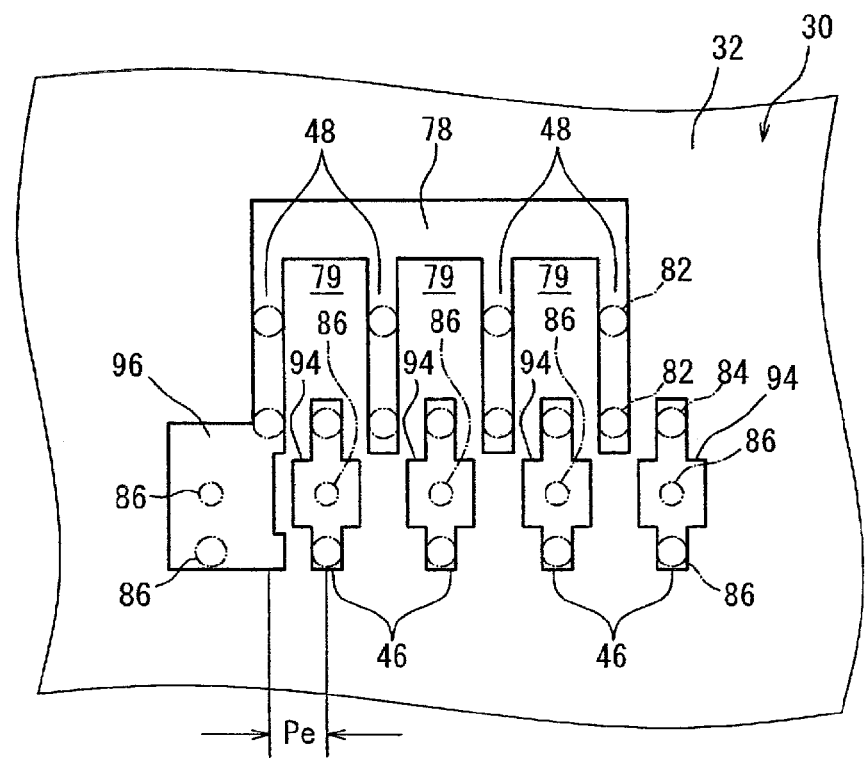
FIG. 12 is a schematic partial plan view showing a region of a circuit board for mounting the photoelectric conversion element of the photoelectric conversion module in a modification.

Although the board-side cathode electrodes 48 are each connected to the IC chip 42 in the photoelectric conversion module 26 of the embodiment, one cathode electrode land portion 96 may be used to connect all board-side cathode electrodes 48 to the IC chip 42 through as shown in FIG. 12. In this case, the edges of the board-side cathode electrodes 48 on the IC chip 42 side do not need to be aligned with the edges of the board-side anode electrodes 46.

Although, the cathode electrode land portion 80 in the photoelectric conversion module 26 of the embodiment is provided at a position allowing the five probes 90 to be arranged in a row as a preferred aspect, the cathode electrode land portion 80 may be provided at another position. For example, the cathode electrode land portion 80 may be connected to the connecting portion 78.

Although the photoelectric conversion array element 44 in the photoelectric conversion module 26 of the embodiment includes four photoelectric conversion elements 70, the photoelectric conversion array element 44 only needs to include two or more photoelectric conversion elements 70.

Lastly, the photoelectric conversion module of the invention is applicable to other than the optical active cable and is, of course, applicable to networking equipments, mobile phones and personal computers, etc., besides digital AV equipments.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A photoelectric conversion module, comprising:
a circuit board comprising a plurality of first board-side electrodes and a plurality of second board-side electrodes that are alternately arranged on a mounting surface of the circuit board in an array direction and each extend into strips in a direction orthogonal to the array direction;
a photoelectric conversion array element mounted on the circuit board and comprising, on a surface facing the mounting surface, a plurality of light receiving/emitting portions, first element-side electrodes connected to the first board-side electrodes and second element-side electrodes connected to the second board-side electrodes, the first element-side electrodes and the second element-side electrodes being each formed corresponding to the light receiving/emitting portions; and
an IC chip mounted on the circuit board and connected to the photoelectric conversion array element through the first board-side electrodes and the second board-side electrodes,
wherein the circuit board further comprises, on the mounting surface, a connecting portion for connecting the first board-side electrodes to each other and a first electrode land portion integrally connected to the first board-side electrode such that the land portion extends a width of a portion of a first side electrode to contact with a first test electrode probe.

2. The photoelectric conversion module according to claim 1, wherein the first electrode land portion is connected to an end one of the first board-side electrodes in the array direction and located nearer the IC chip in relation to a center of the strip first board-side electrodes.

3. The photoelectric conversion module according to claim 1, wherein the second board-side electrodes each comprises a second electrode land portion wider than another portion thereof to contact with a second test electrode probe.

4. The photoelectric conversion module according to claim 1, the connecting portion is distant from an end of the photoelectric conversion array element not facing the IC chip in the strip direction of the first board-side electrodes to have an opening therebetween.

5. The photoelectric conversion module according to claim 1, wherein the photoelectric conversion array element comprises a light-emitting element.

6. The photoelectric conversion module according to claim 1, wherein the plurality of second board-side electrodes are devoid of a connecting portion.

7. The photoelectric conversion module according to claim 1, further comprising: an optical waveguide including grooves.

8. The photoelectric conversion module according to claim 7, wherein each of the grooves accommodates an optical fiber.

9. The photoelectric conversion module, according to claim 7, further comprising:
a mirror member,
wherein the optical waveguide member and the mirror member are provided on a surface opposite to the mounting surface of the circuit board.

10. The photoelectric conversion module, according to claim 9, wherein an optical path extending between the photoelectric conversion array element and the optical fiber penetrates the circuit board.

11. The photoelectric conversion module, according to claim 10, wherein the circuit board includes a translucent film.

12. The photoelectric conversion module, according to claim 1, wherein the connecting portion is distant from an edge of the photoelectric conversion array element and a gap opens outside of the photoelectric conversion array element.

* * * * *